US008279908B2

(12) United States Patent
Iannuzzelli et al.

(10) Patent No.: US 8,279,908 B2
(45) Date of Patent: Oct. 2, 2012

(54) SYNCHRONIZATION OF SEPARATED PLATFORMS IN AN HD RADIO BROADCAST SINGLE FREQUENCY NETWORK

(75) Inventors: Russell Iannuzzelli, Bethesda, MD (US); Stephen Douglas Mattson, Felton, PA (US); Muthu Gopal Balasubramanian, Ellicott City, MD (US)

(73) Assignee: iBiquity Digital Corporation, Columbia, MD (US)

( * ) Notice: Subject to any disclaimer, the term of this patent is extended or adjusted under 35 U.S.C. 154(b) by 895 days.

(21) Appl. No.: 12/346,955

(22) Filed: Dec. 31, 2008

(65) Prior Publication Data

US 2010/0166042 A1 Jul. 1, 2010

(51) Int. Cl.
*H04B 1/707* (2011.01)

(52) U.S. Cl. ........................................................ 375/145

(58) Field of Classification Search .................. 375/354, 375/356, 357, 369, 372, 373, 374; 370/395.62, 370/507; 455/265; 702/89; 713/375, 400
See application file for complete search history.

(56) References Cited

U.S. PATENT DOCUMENTS 5,561,701 A 10/1996 Ichikawa
6,349,214 B1 2/2002 Braun
6,625,209 B1 9/2003 Najafi
7,336,646 B2 2/2008 Muller
2004/0057540 A1* 3/2004 Naberfeld .................... 375/354
2004/0066736 A1 4/2004 Kroeger
2005/0015162 A1* 1/2005 Omura et al. .................. 700/94
2006/0088023 A1 4/2006 Muller
2006/0116073 A1 6/2006 Richenstein et al.
2006/0159193 A1 7/2006 Mattsson et al.
2006/0209941 A1 9/2006 Kroeger
2007/0110185 A1 5/2007 Kroeger et al.
2008/0298440 A1 12/2008 Kroeger et al.
2009/0322596 A1* 12/2009 Rowitch et al. ............ 342/357.1

FOREIGN PATENT DOCUMENTS

WO WO2008110992 A1 9/2008

OTHER PUBLICATIONS

IBOC FM Transmission Specification, Doc. No. SY-TN-5009, Aug. 2001, 42 pgs.
HD Radio AM Transmission System Specifications, Rev. D, Doc. No. SY-SSS-1082s, Feb. 24, 2005, 16 pgs.
"In-Band/On-Channel Digital Radio Broadcasting Standard", National Radio Systems Committee, NRSC-5-A, Sep. 2005, 43 pgs.
"In-Band/On-Channel Digital Radio Broadcasting Standard", National Radio Systems Committee, NRSC-5-B, Apr. 2008, 48 pgs.

* cited by examiner

*Primary Examiner* — Khanh C Tran
(74) *Attorney, Agent, or Firm* — Robert P. Lenart, Esq.; Pietragallo Gordon Alfano Bosick & Raspanti, LLP

(57) ABSTRACT

A broadcasting method includes: using a first transmitter to send a signal including a plurality of frames of data synchronized with respect to a first GPS pulse signal, receiving the signal at a first remote transmitter, synchronizing the frames to a second GPS pulse signal at the first remote transmitter, and transmitting the synchronized frames from the remote transmitter to a plurality of receivers. A system that implements the method is also provided.

20 Claims, 15 Drawing Sheets

SYNCHRONIZATION OF SEPARATED PLATFORMS IN AN HD RADIO BROADCAST SINGLE FREQUENCY NETWORK

FIELD OF THE INVENTION

This invention relates to radio broadcasting systems and more particularly to such systems that include multiple transmitters.

BACKGROUND OF THE INVENTION

The iBiquity Digital Corporation HD Radio™ system is designed to permit a smooth evolution from current analog amplitude modulation (AM) and frequency modulation (FM) radio to a fully digital in-band on-channel (IBOC) system. This system delivers digital audio and data services to mobile, portable, and fixed receivers from terrestrial transmitters in the existing medium frequency (MF) and very high frequency (VHF) radio bands. Broadcasters may continue to transmit analog AM and FM simultaneously with the new, higher-quality and more robust digital signals, allowing themselves and their listeners to convert from analog to digital radio while maintaining their current frequency allocations.

The design provides a flexible means of transitioning to a digital broadcast system by providing three new waveform types: Hybrid, Extended Hybrid, and All Digital. The Hybrid and Extended Hybrid types retain the analog FM signal, while the All Digital type does not. All three waveform types conform to the currently allocated spectral emissions mask.

The digital signal is modulated using Orthogonal Frequency Division Multiplexing (OFDM). OFDM is a parallel modulation scheme in which the data stream modulates a large number of orthogonal sub-carriers, which are transmitted simultaneously. OFDM is inherently flexible, readily allowing the mapping of logical channels to different groups of sub-carriers.

The National Radio Systems Committee, a standard-setting organization sponsored by the National Association of Broadcasters and the Consumer Electronics Association, adopted an IBOC standard, designated NRSC-5A, in September 2005. NRSC-5A, and its update NRSC-5B, the disclosure of which are incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/SG.asp. iBiquity's HD Radio™ technology is an implementation of the NRSC-5 IBOC standard. Further information regarding HD Radio™ technology can be found at www.hdradio.com and www.ibiquity.com.

A typical HD Radio broadcast implementation partitions content aggregation and the audio codec into what is typically referred to as an exporter. An exporter will typically handle the sourcing and audio coding of the Main Program Service (MPS), that is, the digital audio that is mirrored on the analog channel. Feeding into the exporter may be an importer, which aggregates secondary programming other than MPS. The exporter then produces over-the-air packets and forwards those to an exciter or modem part of an exciter platform, which is typically referred to as the exgine.

In some instances, it would be desirable to implement an HD Radio broadcast system as a single frequency network (SFN). Generally, a single frequency network or SFN is a broadcast network where several transmitters simultaneously send the same signal over the same frequency channel. Analog FM and AM radio broadcast networks, as well as digital broadcast networks, can operate in this manner. One aim of SFNs is to increase the coverage area and/or decrease the outage probability, since the total received signal strength may increase at positions where coverage losses due to terrain and/or shadowing are severe.

Another aim of SFNs is efficient utilization of the radio spectrum, allowing a higher number of radio programs in comparison to traditional multi-frequency network (MFN) transmission, which utilizes different transmitting frequencies in each service area. In MFNs, hundreds of stations are established for a national broadcasting service; therefore many more frequencies are used. Simultaneous transmission of programming on multiple frequencies can be confusing to listeners who often don't remember to retune their radios when traveling between coverage areas.

A simplified form of SFN can be achieved by a low power co-channel repeater or booster, which is utilized as a gap filler transmitter. In the United States, FM boosters and translators are a special class of FM stations that receive the signals of a full service FM station and transmit or retransmit those signals to areas that would otherwise not receive satisfactory service from the main signal, again due to terrain or other factors. Originally, FM boosters were translators on the same frequency of the main station. Prior to 1987 FM boosters were limited, by the FCC, to using direct off-air reception and retransmission methods (i.e., repeaters). An FCC rule change allowed the use of virtually any signal delivery method as well as power levels up to 20% of the maximum permissible effective radiated power of the full service station they rebroadcast. With this rule change, FM boosters are now essentially a subclass of SFNs. Many domestic broadcasters currently make use of FM boosters to fill in or extent coverage areas, especially in hilly terrains such as San Francisco.

In areas of overlapping coverage, SFN transmission can be considered as a severe form of multipath propagation. A radio receiver receives several echoes of the same signal, and the constructive or destructive interference among these echoes (also known as self-interference) may result in fading. This is problematic since the fading is frequency-selective (as opposed to flat fading), and since the time spreading of the echoes may result in inter-symbol interference (ISI).

When a receiver is in range of more than one transmitter, the criteria for good reception include relative signal strength and total transmission delay. Relative signal strength describes the relationship of two or more transmitted signals, based on the location of the receiver, whereas total transmission delay is the elapsed time interval calculated from the moment that the signal leaves the studio site to the moment it reaches the receiver. This delay can differ from one transmitter to another, based on the signal path of the specific studio-transmitter link.

In a SFN implementation of an HD Radio system, one exporter can be used in combination with many exgines to improve coverage. The present inventors have observed a need for systems and methods that meet the following requirements for operation of single frequency networks in an HD Radio broadcast system.

With OFDM based systems such as an HD Radio broadcast system, the transmitters have to radiate not just the same but an identical on air signal. Thus, frequencies and phases of the sub-carriers have to be radiated to a very high tolerance. Any frequency offset between carriers in an OFDM system results in inter-symbol interference and a perceived Doppler shift in the frequency domain. For the HD Radio system the frequency offsets are expected to be within ~20 Hz. In addition, the individual sub-carrier frequencies have to appear at the same time. Each transmitter has to radiate the same OFDM symbol at the same time so that the data is synchronized in the time domain. This synchronization depends in large part on the guard time interval, which governs the maximum delays or echoes that an OFDM-based system can tolerate. It also influences the maximum distance between transmitters. An OFDM receiver samples the received signal for a predetermined period of time at regular intervals. In between these sampling times (during the guard interval) the receiver ignores any received frequencies. For the HD Radio broadcast system, each OFDM symbol must be time aligned to within 75 μsec in order for the FM system to operate correctly. Preferably the alignment is within 10 μsec.

Another requirement is that the individual sub-carriers have to carry the same data for each symbol. In other words, the sub-carriers from the different transmitters must be "bit-exact". This means that for each node in the SFN the digital information received at the transmit site from an exporter must contain the identical bits (i.e., MPS digital audio, program service data (PSD), station information service (SIS), and advanced application services (AAS) or other data must be identical). Moreover, the information must be processed by each exgine in an identical fashion so that the output waveform is identical for each transmission node of the network.

It is also desirable that the various pieces of equipment that comprise the network operate asynchronously, such that the equipment can come on or off line without requiring that the entire network be reset. The above described timing accuracies and "bit exactness" must be maintained during independent node restarts (i.e., each node in the SFN can be brought down and brought back up independently of all other nodes without affecting system performance). Each node of the SFN also must have the ability to adjust the transmission delay to account for propagation delays and to be able to tune the SFN.

SUMMARY OF THE INVENTION

In a first aspect, the invention provides a broadcasting method including: using a first transmitter to send a signal including a plurality of frames of data synchronized with respect to a first GPS pulse signal, receiving the signal at a first remote transmitter, synchronizing the frames to a second GPS pulse signal at the first remote transmitter, and transmitting the synchronized frames from the remote transmitter to a plurality of receivers. A system that implements the method is also provided.

In another aspect, the invention provides a broadcasting system including a first transmitter for sending a signal including a plurality of frames of data synchronized with respect to a first GPS pulse signal, and a first remote transmitter including a circuit for synchronizing the frames to a second GPS pulse signal and for transmitting the synchronized frames to a plurality of receivers.

In another aspect, the invention provides a method of synchronizing platforms in a broadcasting system, including: receiving a master clock signal at a base transmitter and a plurality of remote transmitters, starting audio sampling at the base transmitter within a predetermined interval before a first clock pulse in the master clock signal, assembling the audio samples into an audio frame, starting transmission of the audio frame from the base transmitter to the remote transmitters at an absolute layer 1 frame number time occurring after the first clock pulse, receiving the audio frame at the remote transmitter, and transmitting the audio frame from the remote transmitter starting at a time corresponding to the audio frame at an absolute layer 1 frame number time.

DETAILED DESCRIPTION OF THE INVENTION

In one aspect, this invention relates to a method and apparatus for maintaining time alignment required to support a Single Frequency Network (SFN) or booster application in an in-band on-channel (IBOC) system. In another aspect, this invention relates to a method and apparatus for adjusting the delay phase of the waveforms output by multiple transmitters in an SFN.

Figure 1:
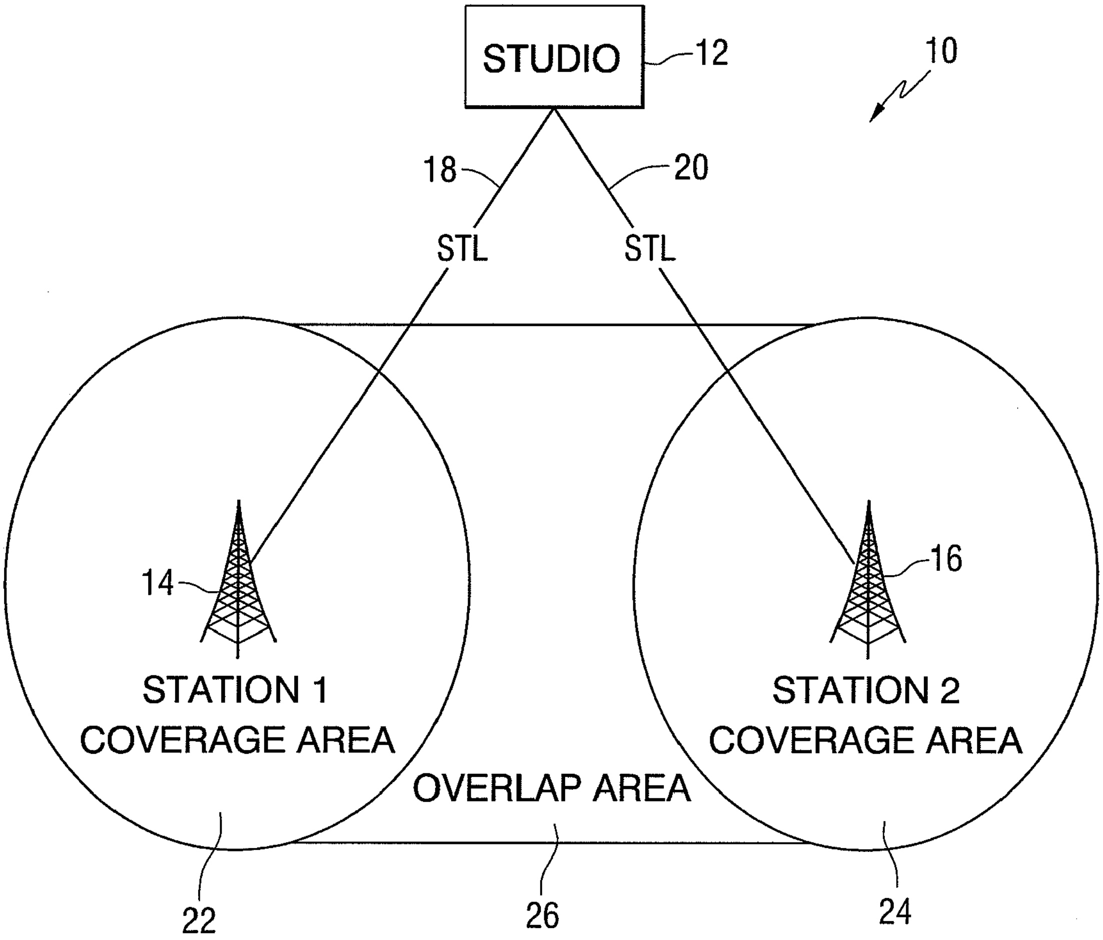
FIG. 1 is a diagram of a single frequency network.

FIG. 1 shows a broadcast system 10 in which the same audio program is simultaneously transported from the studio over STLs to two transmitter sites. In this example, program content that originates at a first transmitter (e.g., a studio) 12 is transmitted to two remote transmitters 14 and 16 (referred to as stations 1 and 2, respectively), using studio to transmitter links (STLs) 18 and 20. The station 1 coverage area is illustrated by an oval 22. The station 2 coverage area is illustrated by an oval 24. Both transmitter sites have equal transmission power. When the receiver is located in the station 1 coverage area, the signal strength from station 2 is low enough as to not affect reception. When the receiver is located in the station 2 coverage area, the reverse situation occurs. The coverage areas are typically defined to be the 20 dB desirable/undesirable (D/U) contour.

When the receiver is located in the overlap area 26, however, it receives signals with power ratios of less than 20 dB from both transmitter sites. In these cases, if the delay between the two signals is less than the guard time, or 75 μsec, the receiver is essentially in a multipath condition and will most likely be able to negotiate this condition and continue to receive the HD Radio signal, especially in a moving vehicle. However, when the relative delay becomes greater than 75 μsec, inter-symbol interference (ISI) can occur and it is conceivable that the receiver will not be able to decode the HD Radio signal and will revert to analog only reception.

In cases where the point of equal field strength is not located at the equal distance point and reception is required, the signal delay at one of the transmitters can be intentionally and precisely altered using the slip-buffering technique described herein. This alters the position of the signal delay curves relative to the signal level curves, and thus could eliminate problem areas or allow them to be shifted to unpopulated areas such as mountaintops or over bodies of water.

Figure 2:
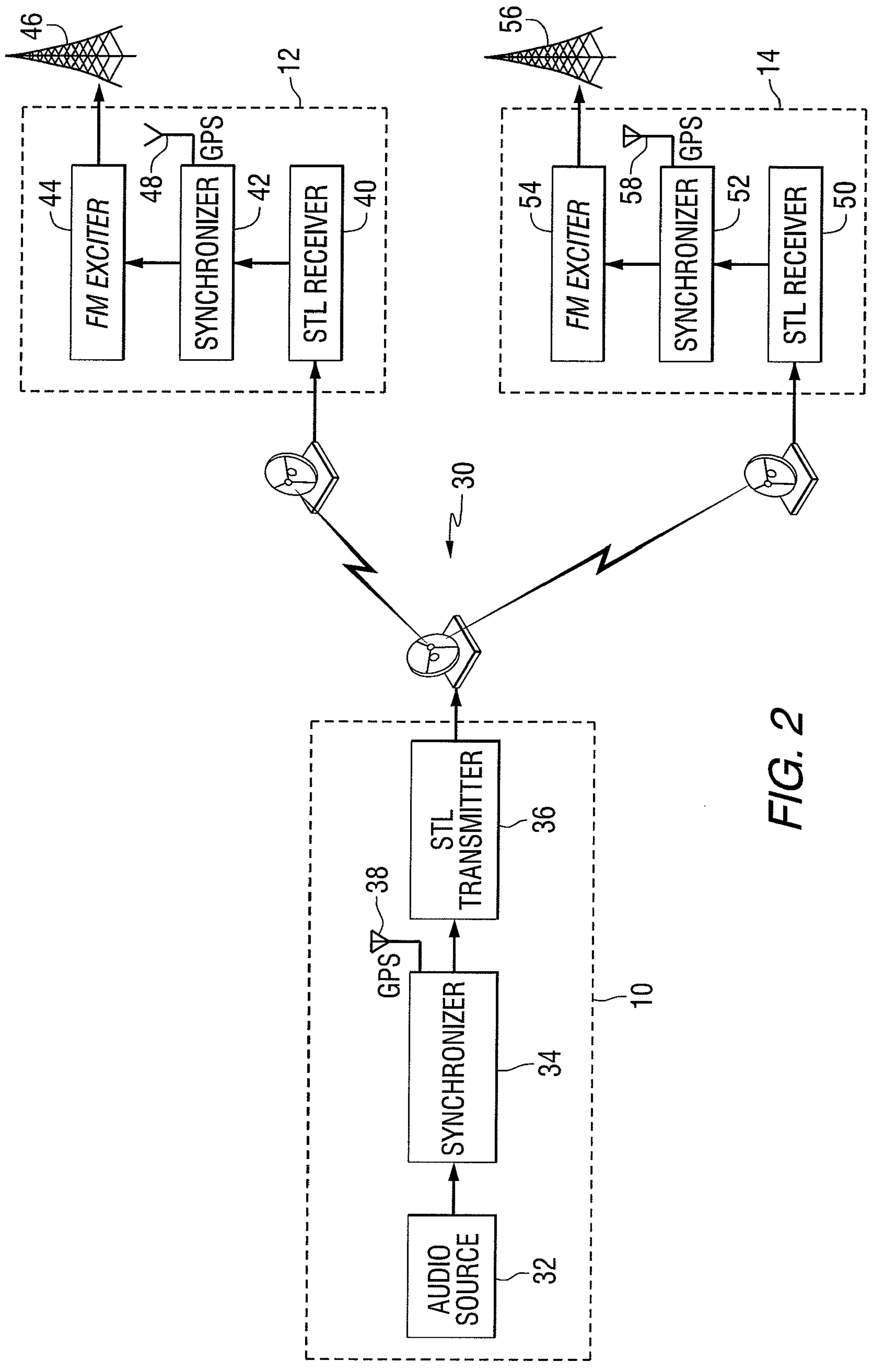
FIG. 2 is a block diagram of a single frequency network.

FIG. 2 shows a basic conceptual diagram of an IBOC SFN. In this figure the STL 30 between the first transmitter (e.g., the studio) and the remote transmitters can be microwave, T1, satellite, cable, etc. In FIG. 2, the studio 10 is shown to include an audio source 32, a synchronizer 34 and an STL transmitter 36. The synchronizer 34 receives a timing signal from a global positioning system (GPS) as illustrated by GPS antenna 38. The timing signals from the global positioning system serve as a master clock signal. The transmitters are also referred to as platforms.

Station 12 is shown to include an STL receiver 40, a synchronizer 42, an exciter 44, and an antenna 46. The synchronizer 42 receives a timing signal from the global positioning system (GPS) as illustrated by GPS antenna 48.

Station 14 is shown to include an STL receiver 50, a synchronizer 52, an exciter 54, and an antenna 56. The synchronizer 52 receives a timing signal from the global positioning system (GPS) as illustrated by GPS antenna 58. The timing signals from the global positioning system serve as a master clock signal.

Figure 3:
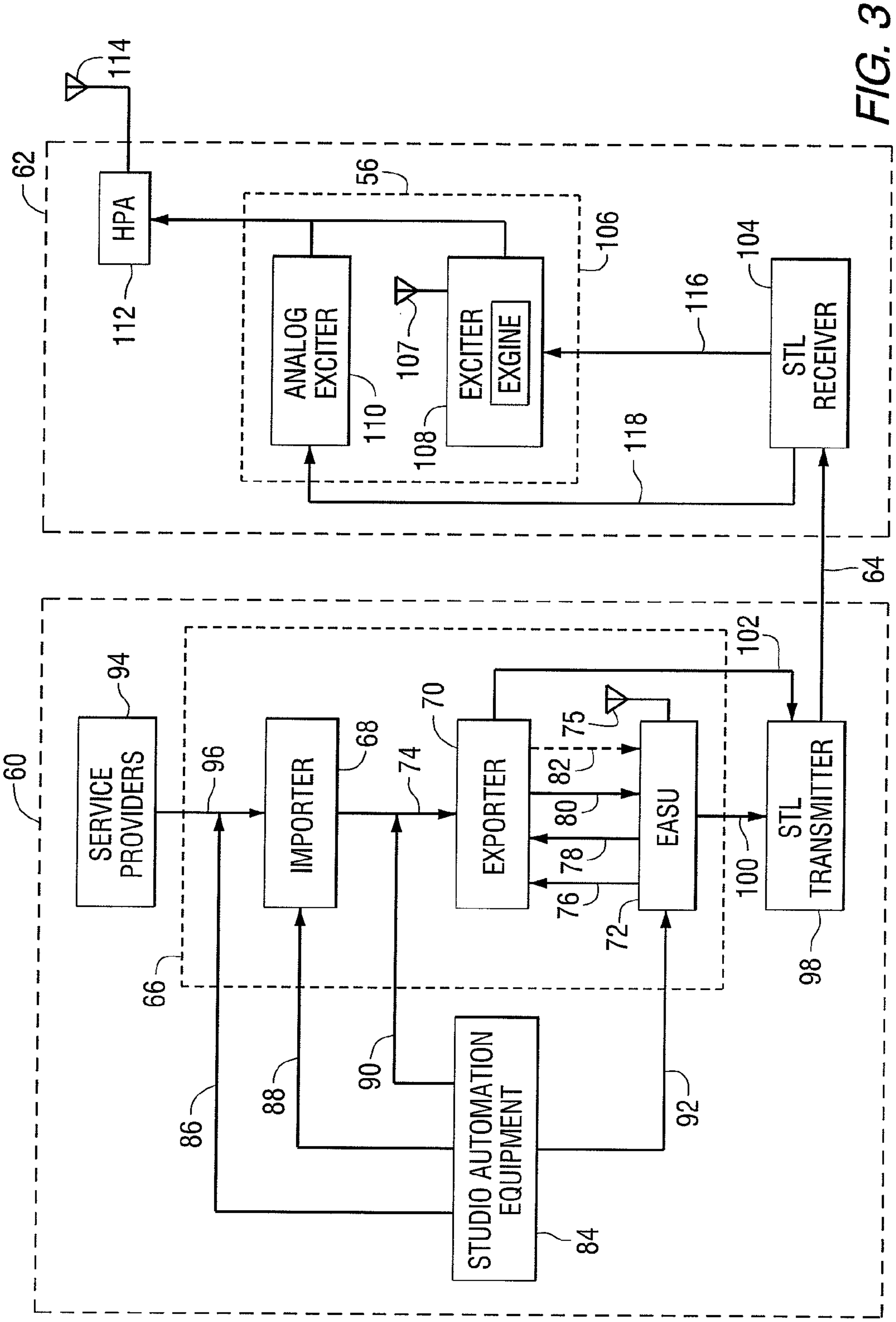
FIG. 3 is a block diagram of a radio broadcasting system.

FIG. 3 is a functional block diagram of the relevant components of a studio site 60, an FM transmitter site 62, and a studio transmitter link (STL) 64 that can be used to broadcast an FM IBOC signal. The studio site includes, among other things, studio automation equipment 84, an importer 68, an exporter 70, an exciter auxiliary service unit (EASU) 72, and an STL transmitter 98. The transmitter site includes an STL receiver 104, a digital exciter 106 that includes an exciter engine subsystem 108, and an analog exciter 110.

At the studio site, the studio automation equipment supplies main program service (MPS) audio 92 to the EASU, MPS data 90 to the exporter, supplemental program service (SPS) audio 88 to the importer, and SPS data 86 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. The supplemental program service can include supplementary audio content, as well as program associated data for that service.

The importer contains hardware and software for supplying advanced application services (AAS). A "service" is content that is delivered to users via an IBOC broadcast signal and can include any type of data that is not classified as MPS or SPS. Examples of AAS data include real-time traffic and weather information, navigation map updates or other images, electronic program guides, multicast programming, multimedia programming, other audio services, and other content. The content for AAS can be supplied by service providers 94, which provide service data 96 to the importer. The service providers may be a broadcaster located at the studio site or externally sourced third-party providers of services and content. The importer can establish session connections between multiple service providers. The importer encodes and multiplexes service data 86, SPS audio 88, and SPS data 96 to produce exporter link data 74, which is output to the exporter via a data link.

The exporter 70 contains the hardware and software necessary to supply the main program service (MPS) and station information service (SIS) for broadcasting. SIS provides station information, such as call sign, absolute time, position correlated to GPS, etc. The exporter accepts digital MPS audio 76 over an audio interface and compresses the audio. The exporter also multiplexes MPS data 80, exporter link data 74, and the compressed digital MPS audio to produce exciter link data 82. In addition, the exporter accepts analog MPS audio 78 over its audio interface and applies a pre-programmed delay to it, to produce a delayed analog MPS audio signal 90. This analog audio can be broadcast as a backup channel for hybrid IBOC broadcasts. The delay compensates for the system delay of the digital MPS audio, allowing receivers to blend between the digital and analog program without a shift in time. In an AM transmission system, the delayed MPS audio signal 90 is converted by the exporter to a mono signal and sent directly to the studio to transmitter link (STL) as part of the exciter link data 102.

The EASU 72 accepts MPS audio 92 from the studio automation equipment, rate converts it to the proper system clock, and outputs two copies of the signal, one digital 76 and one analog 78. The EASU includes a GPS receiver that is connected to an antenna 75. The GPS receiver allows the EASU to derive a master clock signal, which is synchronized to the exciter's clock. The EASU provides the master system clock used by the exporter. The EASU is also used to bypass (or redirect) the analog MPS audio from being passed through the exporter in the event the exporter has a catastrophic fault and is no longer operational. The bypassed audio 82 can be fed directly into the STL transmitter, eliminating a dead-air event.

The STL transmitter 98 receives delayed analog MPS audio 100 and exciter link data 102. It outputs exciter link data and delayed analog MPS audio over STL link 64, which may be either unidirectional or bidirectional. The STL link may be a digital microwave or Ethernet link, for example, and may use the standard User Datagram Protocol (UDP) or the standard Transmission Control Protocol (TCP).

The transmitter site includes an STL receiver 104, an exciter 106 and an analog exciter 110. The STL receiver 104 receives exciter link data, including audio and data signals as well as command and control messages, over the STL link 64. The exciter link data is passed to the exciter 106, which produces the IBOC waveform. The exciter includes a host processor, digital up-converter, RF up-converter, and exgine subsystem 108. The exgine accepts exciter link data and modulates the digital portion of the IBOC DAB waveform. The digital up-converter of exciter 106 converts the baseband portion of the exgine output from digital-to-analog. The digital-to-analog conversion is based on a GPS clock, common to that of the exporter's GPS-based clock, derived from the EASU. Thus, the exciter 106 also includes a GPS unit and antenna 107.

The RF up-converter of the exciter up-converts the analog signal to the proper in-band channel frequency. The up-converted signal is then passed to the high power amplifier 112 and antenna 114 for broadcast. In an AM transmission system, the exgine subsystem coherently adds the backup analog MPS audio to the digital waveform in the hybrid mode; thus, the AM transmission system does not include the analog exciter 110. In addition, the exciter 106 produces phase and magnitude information and the digital-to-analog signal is output directly to the high power amplifier.

Figure 10:
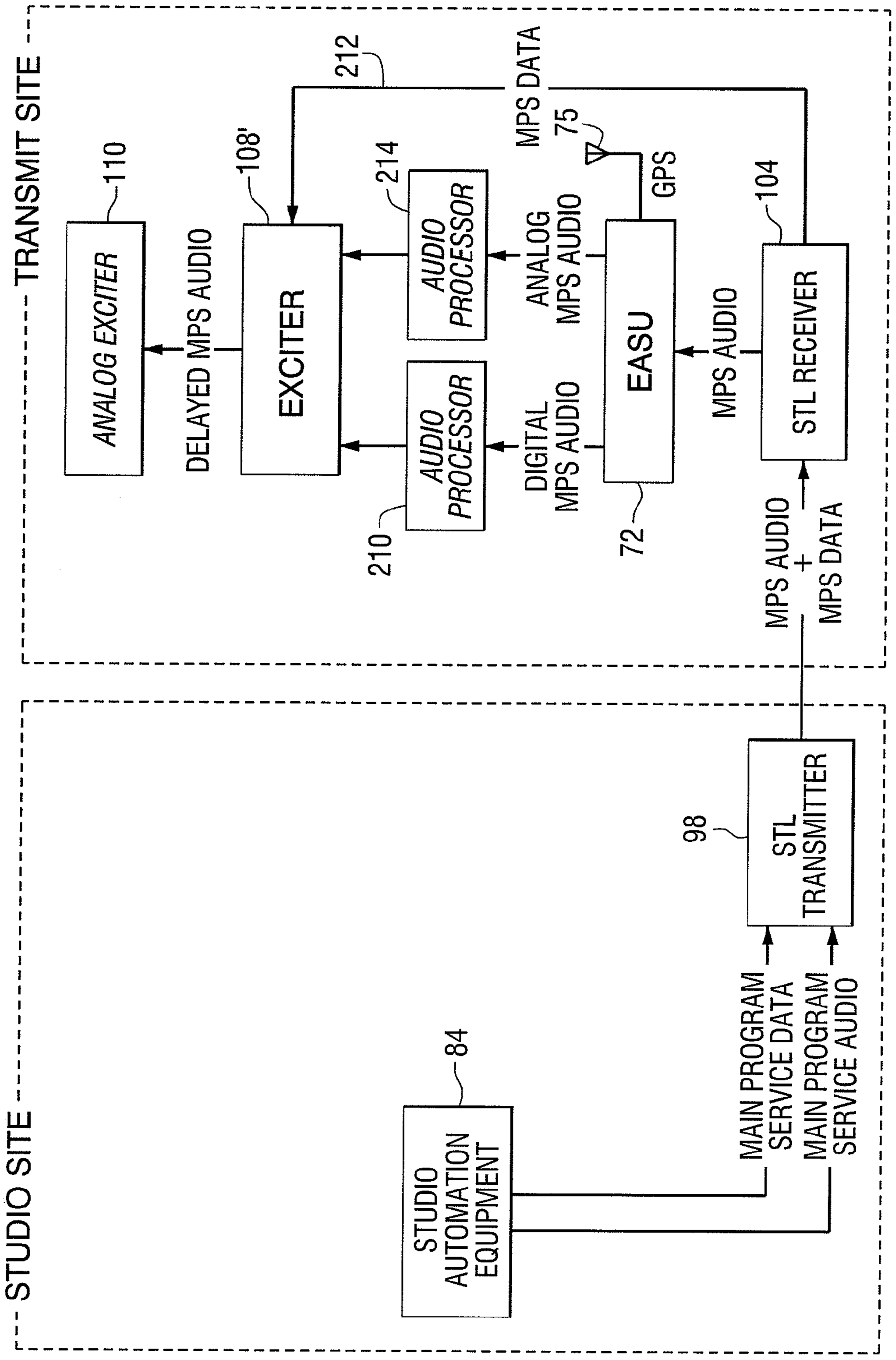
FIGS. 10, 11 and 12 show different broadcast system topologies.

In some configurations, a monolithic exciter combines the functionality of an exporter and exgine, as shown in the broadcast system topology of FIG. 10. In such cases, the exciter 108' contains the hardware and software necessary to supply the MPS and the SIS. The SIS interfaces with the GPS unit in the EASU 72' to derive the information required to transmit timing and location information. The exciter 108' accepts digital MPS audio from audio processor 210 over its audio interface and compresses the audio. This compressed audio is then multiplexed with the main Program Service Data (PSD) as well as the advanced applications services data stream being fed into the exciter on line 212. The exciter then performs the OFDM modulation on this multiplexed bitstream to form the digital portion of the HD Radio waveform. The exciter also accepts analog MPS audio from audio processor 214 over its audio interface and applies a pre-programmed delay. This audio gets broadcast as the backup channel in hybrid configurations. The delay compensates for the digital system delay in the digital MPS audio allowing receivers to blend between the digital and analog program without a shift in time. The delayed analog MPS audio is sent into a STL or directly into the analog exciter 110.

Figure 11:
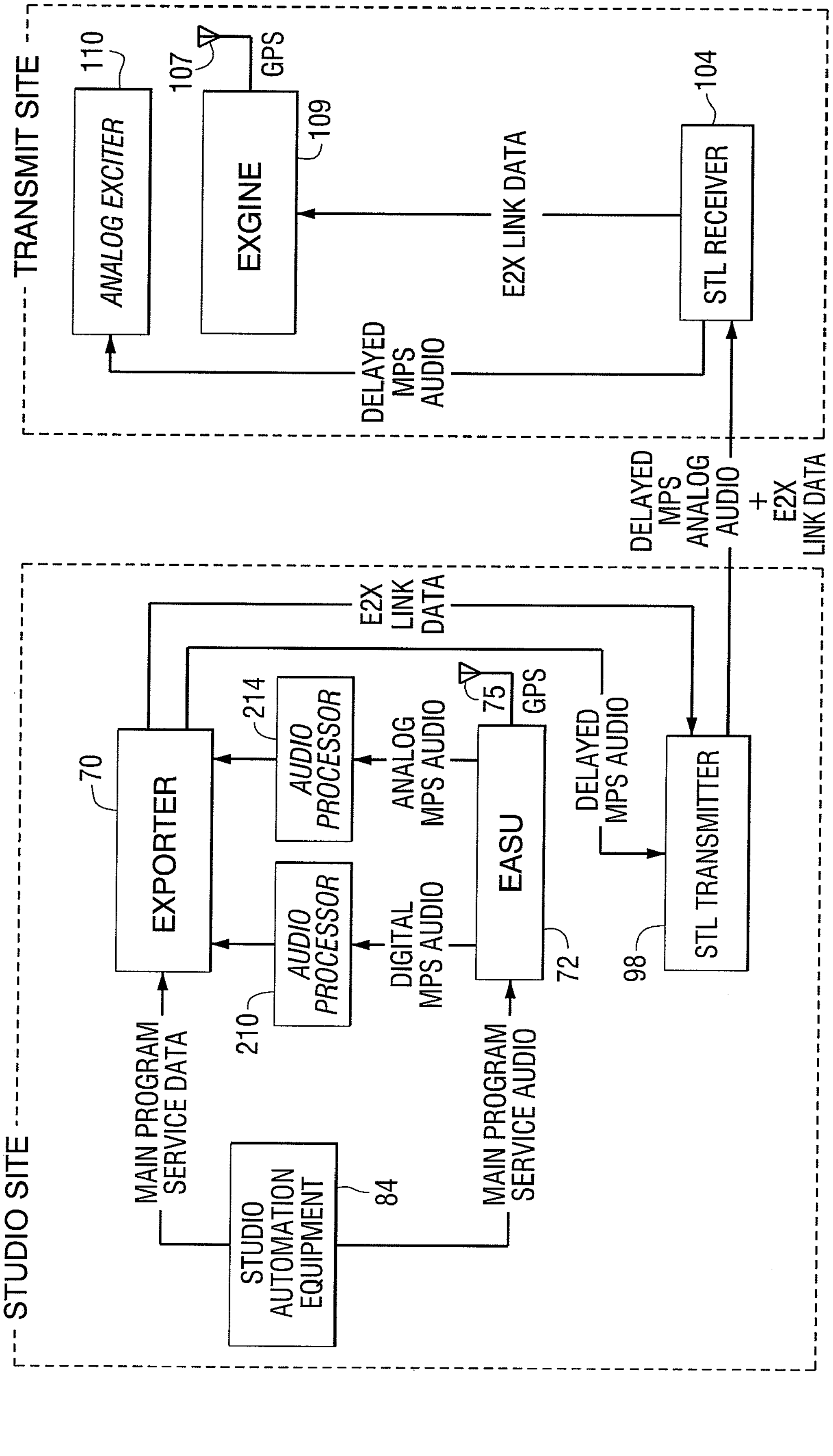

The components of a broadcast system can be deployed in two basic topologies, as shown in FIGS. 10 and 11. In the context of a single frequency network, the studio site can be thought of as the source while the transmit site(s) can be thought of as the nodes. The monolithic topology shown in FIG. 10 cannot support AAS services without substantially increasing the bandwidth of the STL links to accommodate additional HD Radio audio channels. The exporter 70/exgine 109 topology shown in FIG. 11, however, naturally supports the addition of AAS services because the AAS audio/data is first processed and multiplexed onto the existing E2X link, with no additional increase in STL bandwidth requirements over and above what is needed for MPS services. This topology is shown in greater detail in FIG. 12.

Items in FIGS. 3, 10, 11 and 12 that are equivalent to each other have the same item numbers.

IBOC signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

Figure 4:
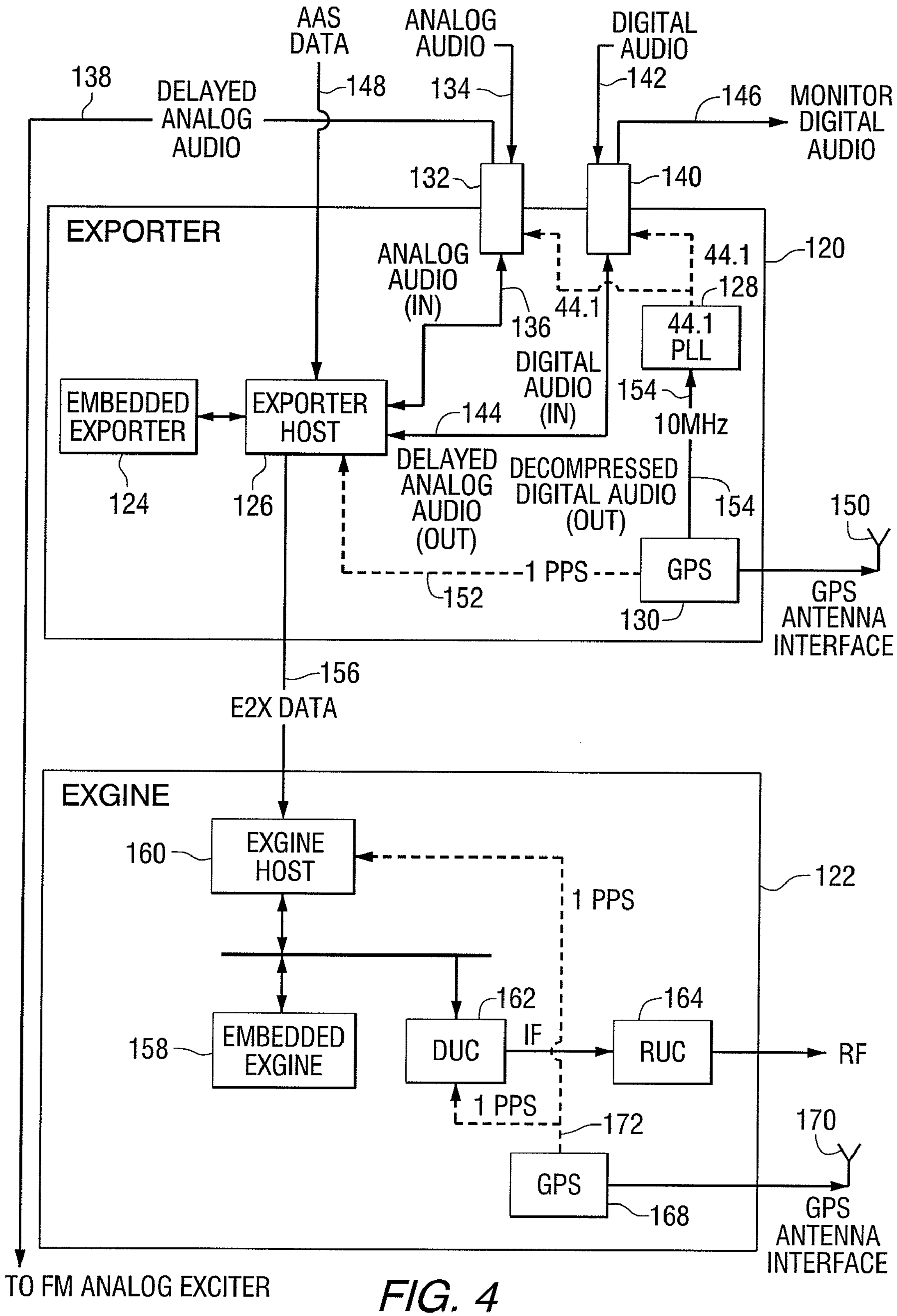
FIG. 4 is a block diagram of portions of an exporter and an exgine/exciter.

FIG. 4 shows a basic block diagram of portions of an exporter system 120 and an exgine system 122 that can be used to practice the invention, shown in a configuration emphasizing the clock signals throughout the system. The exporter system is shown to include an embedded exporter 124, an exporter host 126, a phase locked loop (PLL) 128, and a GPS receiver 130. Audio card 132 receives analog audio on line 134 and sends the analog audio to the exporter host on bus 136. The exporter host sends delayed analog audio back to audio card 132. Audio card 132 sends the delayed analog audio to the analog exciter on line 138.

Audio card 140 receives digital audio on line 142 and sends the digital audio to the exporter host on bus 144. The exporter host sends decompressed digital audio back to audio card 140. The digital audio can be monitored on line 146.

AAS data is supplied to the exporter host on line 148. The GPS receiver is coupled to a GPS antenna 150 to receiver GPS signals. The GPS receiver produces a one pulse per second (1-PPS) clock signal on line 152, and a 10 MHz signal on line 154. The PLL supplies 44.1 clock signals to the audio cards. The exporter host sends exporter to exgine (E2X) data to the exgine on line 156.

The exgine system is shown to include an embedded exgine 158, an exgine host 160, a digital up-converter (DUC) 162, an RF up-converter (RUC) 164, and a GPS receiver 168. The GPS receiver is coupled to a GPS antenna 170 to receive GPS signals. The GPS receiver produces a one pulse per second (1-PPS) clock signal on line 172.

In general, an exciter is essentially an exporter and exgine in a single box with the exporter host and exgine host functionality combined. Also, in one implementation the GPS unit and various PLLs can reside in the EASU. However, in FIG. 4 they are shown residing in the Exporter and Exgine for simplicity.

From FIG. 4 it can be seen that the DUC and audio cards are being driven by the same 10 MHz clock if they are both GPS synchronized to the GPS 1-PPS signal. Both the exporter host and exgine host have access to a one pulse per second (1-PPS) clock signal. This clock signal is used to supply a precise start trigger to both the audio sampling and the waveform start. In the exporter host, the 1-PPS clock signal is used to generate a time signal (ALFN) transmitted with the station information service (SIS) data. One aspect of this system is the relative delay between the analog audio and the digital audio.

Figure 13:
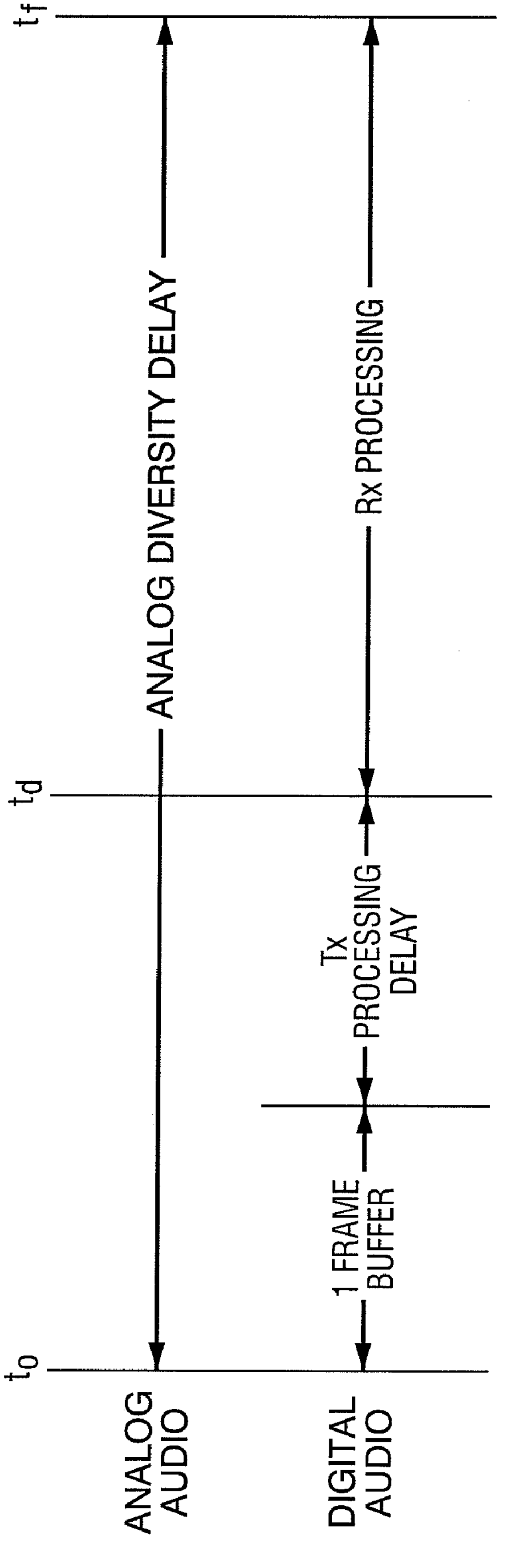
FIG. 13 is a timing diagram showing simplified analog and digital alignment timing.

FIG. 13 shows a simplified diagram of this timing. At to the audio cards begin to collect both analog and digital audio samples. For the digital path, these samples are first buffered and compressed before they can be processed and transmitted over the air at $t_d$. The buffer length is exactly 1 modem frame or ~1.4861 seconds and the processing delay is on the order of 0.55 seconds. Once the digital signal is received it takes exactly 3 modem frames (or ~4.4582 seconds) for the receiver to process the digital signal and make available the digital audio at $t_f$. Therefore, in order for the analog and digital signals to be time aligned, at $t_f$, the analog audio must be delayed by 4 modem frames plus any exciter processing delays (~6.5 seconds) before it is transmitted. Any analog audio processing delays or propagation delays are not represented because they are too small to be represented, but may need to be considered when attempting to synchronously start multiple transmit sites.

From a software perspective, the packaging and modulation of HD Radio broadcast content is performed according to a logical protocol stack, as described by the NRSC-5 documentation previously referenced herein. This multi-threaded environment, when used in a system that needs highly accurate and repeatable start-up timing, has a major drawback because each thread is assigned a time-slice and the operating system coordinates and schedules when a particular thread executes, resulting in an inherent variability of a receiving threads processing of data. This is most critical in Layer 1, the modulation layer, where the DUC is not started until after it has processed the first frame of data. As a result, there is an inherent jitter between when the audio card begins to collect samples and when the DUC begins to output samples. This jitter manifests itself as an analog/digital misalignment each time the system is restarted. The start-up jitter has been observed to be as much as 20 msec. The embedded exporter, performing the functions in Layer 4 through Layer 1, has modernized the original multi-threaded approach, and has reduced the timing of the entire system to be much more deterministic: the start-up jitter is now within approximately 1 msec. Although the start-up jitter has been substantially reduced, it can never be eliminated without some type of synchronization between the starting of the audio sampling and the starting of the DUC waveform. The system design described herein for SFNs addresses this inherent start-up timing variability.

Based on the system requirements, there are four main aspects to this design: waveform exactness, time alignment, frequency alignment, and adjustability. Each of these aspects is addressed in turn.

Waveform Exactness

Regarding waveform exactness, because the time domain waveforms broadcast by each transmitter must be identical, each ODFM symbol must not only be time aligned but must contain identical information. Each transmitter in an SFN has to radiate the same OFDM symbol at the same time so that the data is synchronized in the time domain. The exactness of the OFDM symbols means that the information (both audio and data) must be processed in an identical manner. That is, in the layer system architecture used in the HD Radio system, each Layer 1 protocol data unit (PDU) being modulated must be bit-exact.

While the monolithic topology shown in FIG. 10 is advantageous for allowing existing SFNs to gradually migrate to HD Radio broadcasting, it is impractical from the standpoint of waveform exactness. First, the audio codec displays hysteresis and the output cannot be predicted without looking at the history of the input. This means that if one node of the network is started at a different time than the other nodes the output from the audio codec can be different, even if the audio signal entering the system is perfectly aligned. Secondly, the PSD information entering the system is non-deterministic and also displays hysteresis. Finally, the monolithic topology does not easily allow for the use of advanced features.

Figure 12:
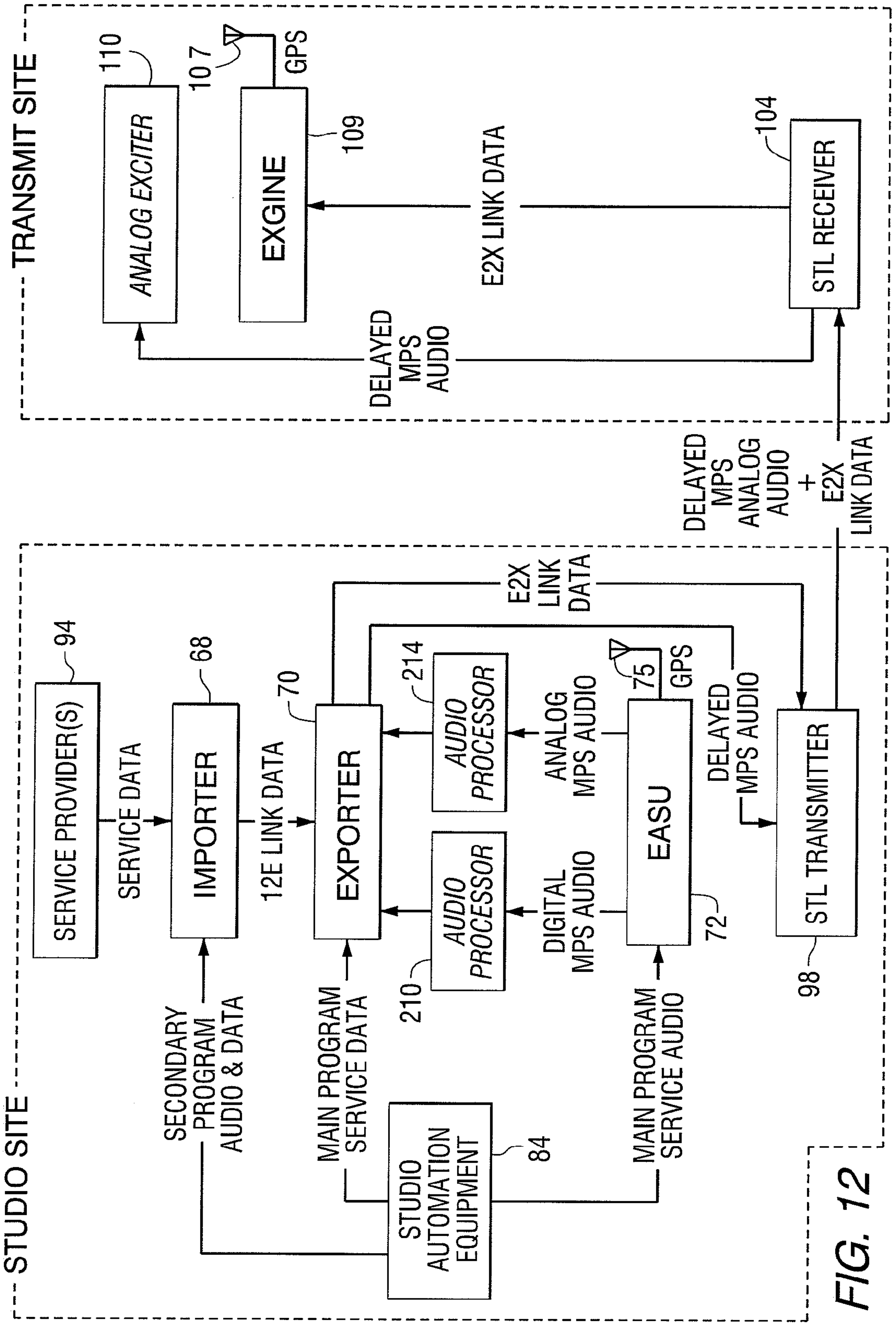

Given the above shortcoming of the monolithic topology, the logical choice for supporting SFNs is the exporter/exgine topology shown in FIGS. 11 and 12. In this topology, all the source material for each of the network nodes is processed from a single point, producing bit-exact Layer 1 PDUs and since the Layer 1 processing is deterministic (i.e., displays no hysteresis) each of the exgine nodes will produce the same waveform given the same input.

The exporter/exgine topology is not limited to a single exporter exgine pair, but the Exporter software is designed to send the same data to multiple exgines. Care will have to be taken to make sure the number of exgines (nodes) supported does not exceed the timing restrictions of the system. If the number of nodes becomes large, either a UDP broadcast or multicast capabilities will have to be added to the broadcast system.

Time Alignment

Regarding time alignment, identical OFDM waveforms must be produced at each node of the SFN and each of the nodes in the SFN must guarantee that it is transmitting the same OFDM symbols at exactly the same time. As used in this description, a node refers to the studio STL transmitter, as well as the remote station transmitters.

Synchronous starting and asynchronous starting must both be accounted for. Synchronous starting is the case where the exgines at each node are online and waiting to receive data before the exporter comes online. An asynchronous start is where an exgine at an individual node comes online at any arbitrary time after the exporter is online. In both cases the absolute time alignment of the OFDM waveforms at all the nodes must be guaranteed. In addition, any method of time alignment must be robust to network jitter and account for different network path delays to each of the network nodes.

In most previously known SFN implementations some extra data is added to the STL links sent to each of the nodes. This additional data is essentially a time reference signal. At each node, the OFDM modulator uses this time stamp to calculate the local delay so that a common on-air time is achieved. However, the method of this invention exploits certain relationships, or geometries, between the 1-PPS GPS clock signals and the ALFN times associated with each frame of data to guarantee absolute time alignment without the need to send additional timing information across the E2X link.

The SFN requires that if exciter sites come online asynchronously with each other and with the main and only exporter, the absolute time alignment between sites is preserved. Thus, both the synchronous start (where the exciter site is online before the exporter comes online) and the asynchronous start need to preserve waveform alignment. That is, every exciter on the network will produce the same waveform at the same instant of time as every other exciter.

The method described here relies on a GPS receiver to be active and locked at each site that needs to be aligned. The GPS receiver supplies a 1 Pulse Per Second (1-PPS) hardware signal that will produce a time alignment across platforms, and the 10 MHz signal from the GPS will produce the frequency and phase alignment across platforms. The waveform will be aligned and started on an absolute layer 1 frame number (ALFN), which is the index of a rational number (44100/65536) times the number of seconds since GPS start time 12:00 am Jan. 6, 1980. The start of the main program service (MPS) audio in the exporter is controlled so that the waveform can start on an ALFN time boundary with either a synchronous start (exgines already up and waiting) or an asynchronous start (exgines come online at any arbitrary time after the exporter is alive).

One mechanism that can be used to ensure that the digital waveform is started on an exact ALFN time boundary is to put the Digital Up Convertor (DUC) into an operating mode where an offset can be supplied to the DUC. The offset controls when the DUC waveform will start after the next 1-PPS signal which is input on an interrupt line. The 1-PPS signal is input into the DUC as an interrupt to the firmware processor controlling the DUC. At the DUC driver level, the DUC firmware processor is supplied a “nano seconds to start after next 1-PPS” value which has approximately 17 nanosecond resolution. The amount of time is converted into the number of 59.535 MHz clock cycles of the DUC firmware processor. This type of DUC “arming” or setting up for starting will allow “hardware level” time synchronized starting of the DUC waveform.

It is important to know the exact time of the first audio sample in order to keep the audio start time to waveform start time constant. Some audio cards could be armed and triggered in a similar way to the way the DUC hardware is armed and triggered. One example of an audio card that does not have a hardware trigger is the iBiquity reference audio card. Instead of hardware triggering, the audio card driver grabs a 64 bit cycle count of the host processor at the time the audio card is started. The cycle count of the host processor is also grabbed when the 1-PPS signal is input, thus a mechanism exists to correlate the times of the audio start sampling and the GPS time. The preferred approach would be to have the audio sampling directly tied to the 1-PPS signal as well.

Figure 14:
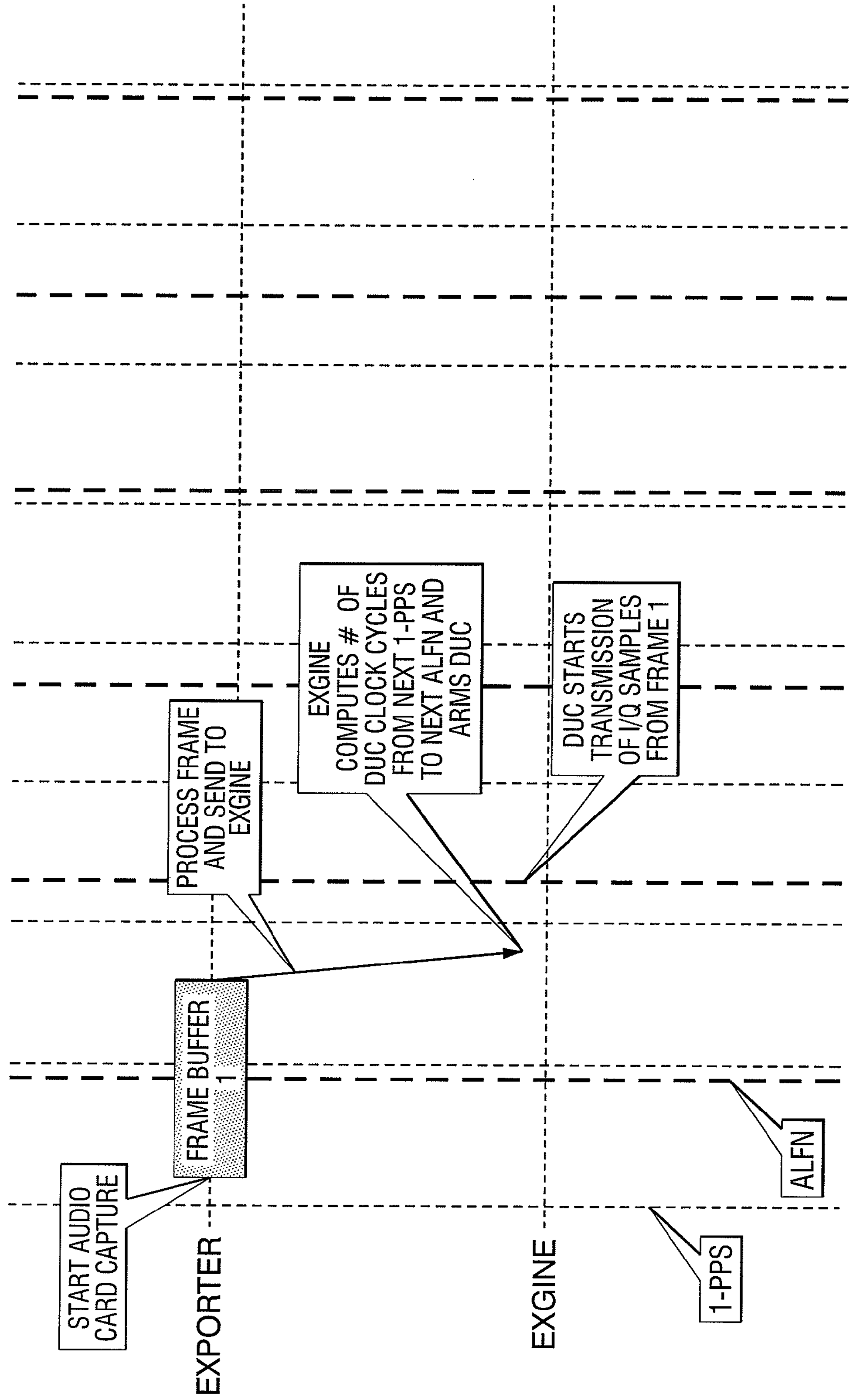
FIGS. 14 and 15 are timing diagrams for synchronous and asynchronous starts of an exporter and exgine.
Figure 15:
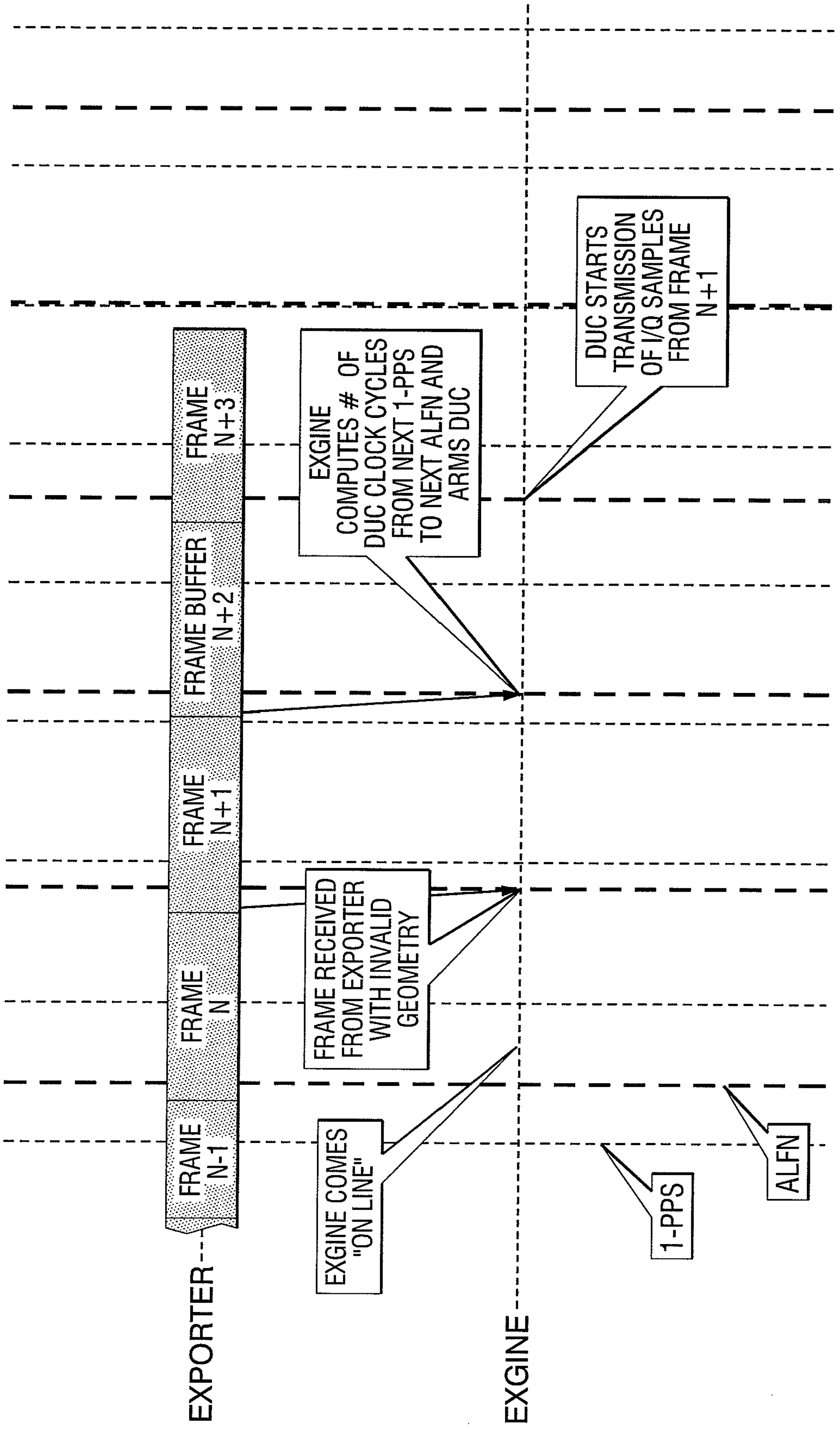

As long as the audio card is started several hundred milliseconds before one of 3 potential 1-PPS signals, then there will exist a geometry such that when the data message is received at the exgine, there will be only a single 1-PPS signal before the next ALFN with enough time to arm the DUC with the necessary delay buffer to the next ALFN. An example of this synchronous “startable” geometry is shown in FIG. 14. In the case of an asynchronous start, the logical framing has already been established. But because there is not an integer relationship between ALFN and the 1-PPS signals and the start-time of the Exporter is unknown, the phase between the 1-PPS and the correct ALFN is also unknown. As long as the audio card in the exporter is started ~0.9 seconds before the appropriate 1-PPS signal, a geometry is established such that the immediate ALFN or the next ALFN will display the proper 1-PPS to ALFN relationship needed to start the DUC. An example of this is shown in FIG. 15.

Figure 5:
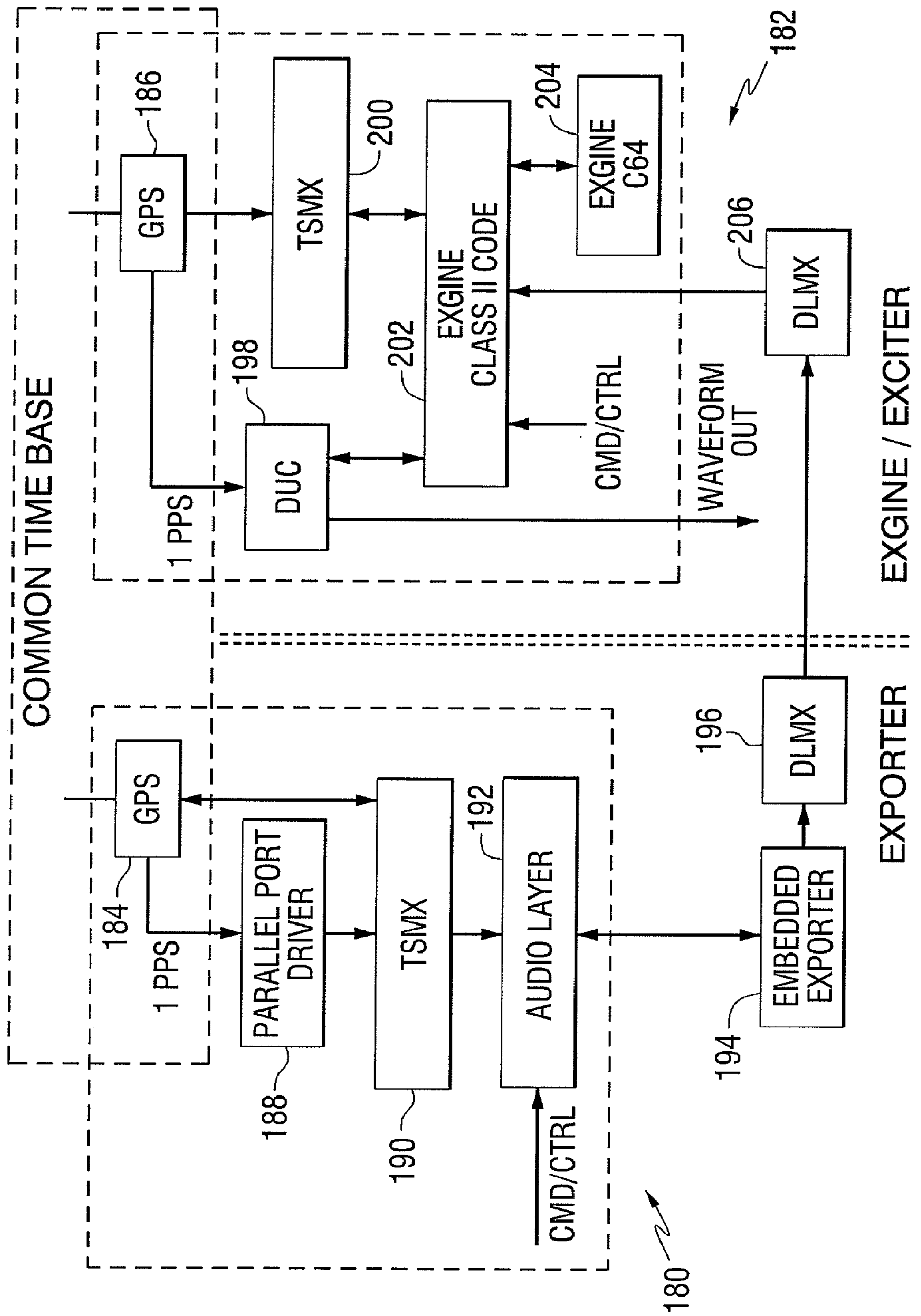
FIG. 5 is another block diagram of portions of an exporter and an exgine/exciter.

FIG. 5 is a block diagram of a split configuration exporter platform 180 and exgine platform 182 that has been used to verify cross platform synchronization. As can be seen from FIG. 5, the exporter and the exgine platform each have a GPS receiver 184, 186 that is referenced to a common time base (i.e., a master clock). In the exporter platform, the 1-PPS pulses produced by the GPS receiver unit are directed to a parallel port pin 188 and input into the exporter host code. It should be understood that the block diagram of FIG. 5 shows a set of functions that can be implemented many ways.

One preferred implementation uses a space-time management software module termed TSMX on both the Exporter platform and the Exgine platform. The role of the TSMX module in the synchronized starting application is to collect the GPS time information with the exact 64 bit cycle count of the 1-PPS signal and supply all that information to the audio layer (on the Exporter platform) or the Exgine class II code (on the Exgine platform). The TSMX module 190 appends the time stamp from the GPS hardware via a serial port with the 64-bit cycle count of precisely when the 1-PPS signal was input on the parallel port. This provides the necessary information to the audio layer 192 so that a synchronous start can be attempted. The audio information from the audio layer is passed to an embedded exporter 194 and transmitted to the exgine through a data link multiplexer 196.

On the exgine platform, the DUC hardware 198 includes a mechanism to input the 1-PPS hardware signal from the GPS Receiver as a hardware level interrupt signal. This information is time stamped at input (64-bit cycle count) and sent to the TSMX module 200. The TSMX module packages the GPS time with the 64-bit cycle count of the last 1-PPS together, and makes them available to the exgine class II code to calculate the appropriate start time. With this mechanism, both the exporter platform and the exgine platform are essentially on a common time base. The timing relationships between the 1-PPS clock signal and the ALFN timing are described below.

The potential ALFN times (exact times every 1.486077 seconds) are completely asynchronous to the 1-PPS times. Thus, in order to handle any arbitrary system start times, the synchronous starting algorithm must handle any possible 1-PPS and ALFN time geometry.

It can be shown that as long as the audio card is started several hundred milliseconds before one of 3 potential 1-PPS signals, then there will exist a timing geometry such that when the data message is received at the exgine, there will be only a single 1-PPS signal before the next ALFN with enough time to arm or set up the DUC to start at the next ALFN time.

In order to ensure a “startable” geometry of 1-PPS and ALFN time, a theorem has been developed that bounds the distances between ALFN time and any 3 consecutive 1-PPSs for a synchronous start. A “startable” geometry of ALFN time, 1-PPS and audio start is where the audio start sampling occurs first, several hundred milliseconds before the next 1-PPS. On that 1-PPS, the DUC is armed with the necessary delay after that 1-PPS to start the waveform such that the waveform will transition to on at the next exact ALFN time.

If the waveform starts on an ALFN time, then the ALFN time has to occur after that 1-PPS by more than some epsilon so that the DUC can be armed.

The ALFN time can be represented as:

$$a_m = (\alpha/\beta)m$$

where $\beta<\alpha<2\beta$ and m is the ALFN index which is typically just termed the ALFN. In our particular case, $\alpha=65536$, and $\beta=44100$. For every n, there exists three consecutive integers n, n+1, n+2 such that $p \in \{n, n+1, n+2\}$, and $$a_m - p < 2-(\alpha/\beta).$$

This suggests that there exists a geometry within 3 1-PPSs of any arbitrary system start time, regardless of an arbitrary AFLN time/1-PPS geometry, where the difference between an ALFN time and a 1-PPS is less than ~0.5139 seconds. This allows the set up of a geometry where the audio start happens before the 1-PPS and the ALFN time happens within 0.5139 seconds after the 1-PPS.

This is important from a system perspective, because the exporter will calculate the geometry and will be able to start the audio sampling shortly before the 1-PPS where the ALFN time is within 0.5139 seconds. This will keep the audio start to waveform start as small as possible while still preserving the audio start/1-PPS/ALFN time geometry. In one particular system, the audio start to waveform start time is 0.9 seconds.

Figure 6:
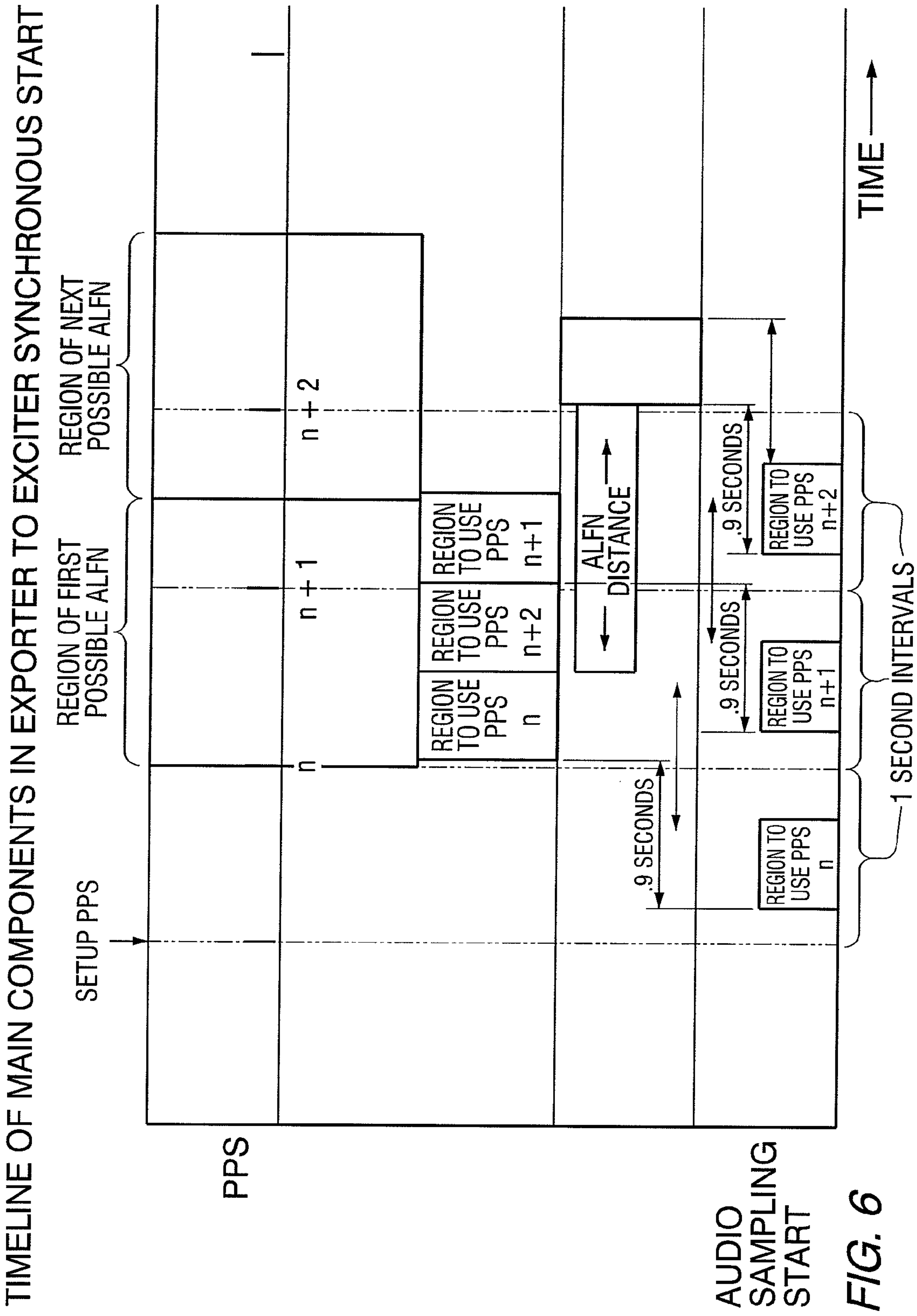
FIGS. 6, 7 and 8 are timing diagrams that illustrate the operation of various aspects of the invention.

FIG. 6 is a timeline of the main components in an exporter to exciter synchronous start operation. As shown in FIG. 6, the exporter will wait for a 1-PPS to occur and will call this the set-up 1-PPS. At this point the L5 Exporter code does not know the timing relationship of the 1-PPS and the ALFN time. The audio will be started 0.9 seconds before the next 1-PPS if the next ALFN time falls in the region labeled “Region to use the pps n”. If the next ALFN time occurs in the adjacent region labeled “Region to use pps n+2” then the audio start will be delayed until the region labeled “Region to use pps n+2” in the Audio Sampling Start labeled row. The reason that this start scenario will be delayed is so that a 1-PPS occurs between the audio start and the ALFN time to start the waveform. The only other possible place the ALFN time could occur, if not in these first 2 regions, is in the region labeled “Region to use pps n+1”. If this start scenario is used then the audio start will occur in the region labeled “Region to use the pps n+1”.

The 0.9 second time period was chosen to satisfy both the synchronous start and the asynchronous start conditions. The asynchronous case involves an exporter that is active and an exgine that comes up online afterwards. In this case the logical framing has already been established by the exporter, however, at the exgine start time we do not know the phase relationship of the 1-PPS to the ALFN time.

In the case of an asynchronous start, the logical framing has already been established. But because there is not an integer relationship between ALFN time and the 1-PPS and the start-time of the exporter is unknown, the phase between the 1-PPS and the correct ALFN time is also unknown. It can be shown that as long as the audio card in the exporter is started ~0.9 seconds before the appropriate 1-PPS signal, a geometry is established such that the immediate ALFN time or the next ALFN time will display the proper 1-PPS to ALFN time relationship needed to start the DUC.

Figure 7:
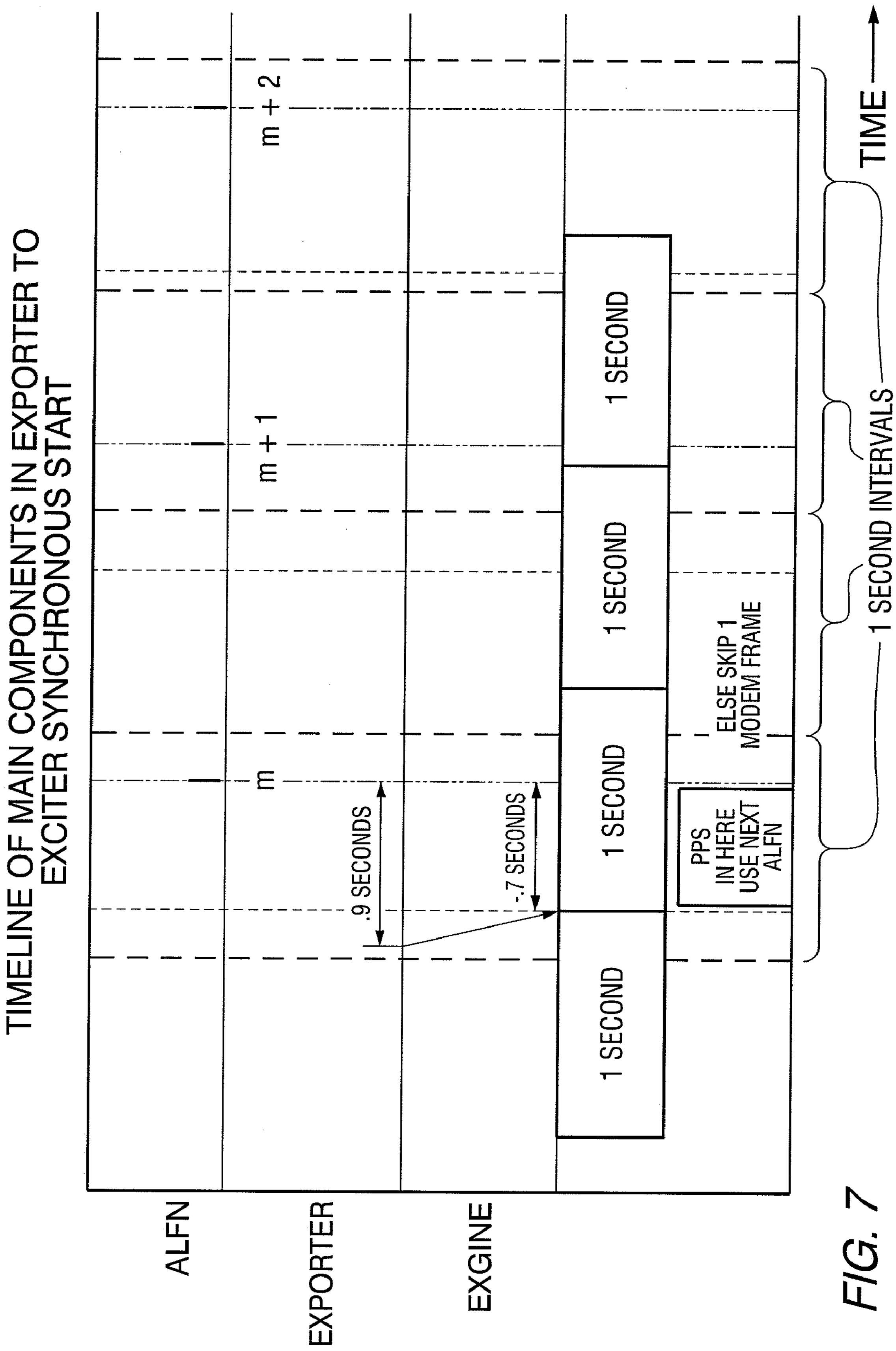

FIG. 7 is a timeline of the main components in an exporter to exciter asynchronous start operation. In FIG. 7, the AFLN indexes (m, m+1, m+2, . . . ), spaced by the ALFN time are shown on the top row, with the exporter timing below, and with the exgine timing under that. The bottom row shows regions of support for the corresponding ALFNs (either m, m+1, or m+2). The dark checked lines and the boxes labeled “1 SECOND” are meant to show the possibly many geometries between the ALFN times and the 1-PPS signals. What is important to realize is that if the exporter has set up the initial timing as described in the exporter row (starting the audio 0.9 seconds before an ALFN time), then regardless when the exgines come on line, they should receive the data for the next ALFN time waveform output about 0.7 second before that ALFN time. Then according to the bottom row, if the next 1-PPS occurs in the region labeled “PPS in here, USE NEXT ALFN”, the next ALFN time will be the waveform start time. If this is not the case then it may be necessary to skip one modem frame (exactly 1 ALFN time) and look to the next ALFN time to start the waveform. If all 1-PPS lines are moved together, the regions of 1-PPS support for starting the waveform at particular ALFN times can be observed.

FIG. 7 shows that the 0.9 seconds is needed to establish a geometry such that when an asynchronous start occurs, either the immediate ALFN (m) time or the next ALFN (m+1) time can be used as the waveform start time. One specific implementation on a reference system takes about 200 milliseconds to transfer the clock message from the audio start to the exgine.

Another way to look at the constraints of the problem is as follows. If we want to find a satisfactory arming time of the exgine before the candidate ALFN time, then at the point where $$a_m - P_n = \text{arm} - \epsilon,$$

(where arm is the arming time difference to the ALFN time $a_n$ at the next $p_n$ 1-PPS and is the guard interval) the difference is too small and we must use the next ALFN time. The equation governing that boundary would be $$a_{m+1} - P_{n+2} \geqq \epsilon$$

Substituting in from the above equation, we find that $$\text{arm} \geqq 2 - (\alpha/\beta).$$

If we move the sequence of dark 1-PPS lines so that there is one at the back edge of the first "1 SECOND" area, $$a_m - p_{n \leqq \epsilon},$$

then $$a_{m+1} - p_{n+1} \leqq \text{arm} - \epsilon.$$

But it also has to be true that $$a_{m+1} - p_{n+1} \leqq \text{arm} - \epsilon.$$

Solving for δ we get $$\delta \geqq (\alpha/\beta) - 1 + \epsilon.$$

Thus, choosing arm to be 0.7 and a guard interval of $\epsilon$ to be 25 milliseconds would put the audio start to waveform start at approximately 0.9 and give sufficient space to support either the first ALFN time start or the second ALFN time start.

It may be possible to simply calculate the ALFN time that can be used to start the waveform based on the arm value, the 1-PPS, and where we are in time when we are clear to make the calculation, i.e., after the clock signal has arrived at the exgine. However, after examining the various geometries and depending on how small the arm value is, it may be many ALFNs times into the future before a start geometry appears.

Figure 8:
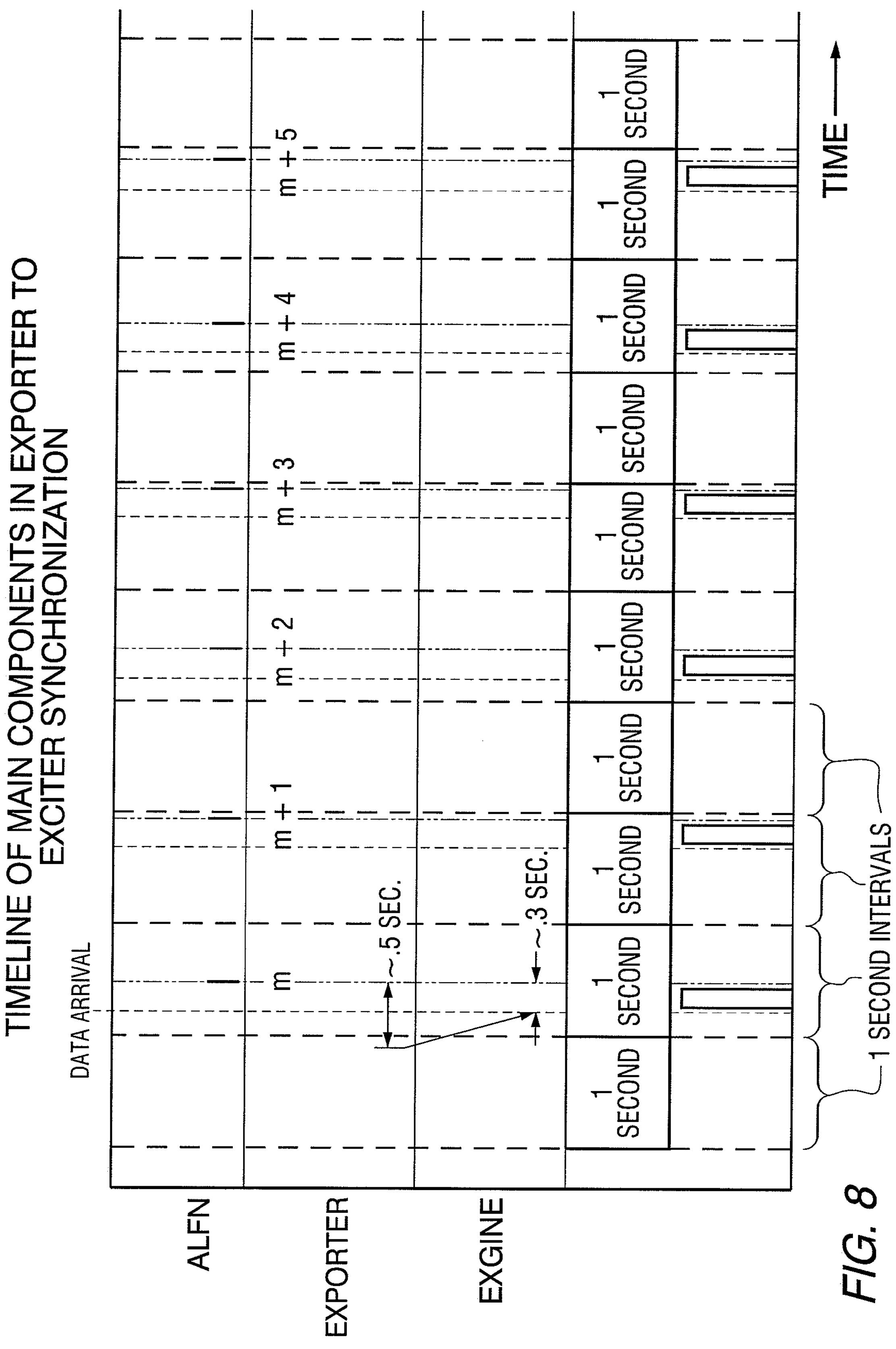

FIG. 8 shows a timeline of the main components in exporter to exciter synchronization. Here it can be seen, by moving the 1-PPS lines around in unison, that if we choose an audio start to waveform start interval that is too small, it may not be possible to find a solution where there is a startable geometry of the 1-PPS and the ALFN time. For the example described here, 0.9 or 0.8 seconds of audio start to waveform start time is sufficient to guarantee a startable geometry within several ALFN times.

This invention provides a synchronization method that does not require sending timing information with the transmitted data. An implementation of the described method may rely on certain features in the hardware components to ensure that accurate timing can be calculated. First, the audio cards must have either a hardware trigger that would allow them to be either started or delay started on a 1-PPS signal or alternately the audio card must record a cycle count when they do start sampling so accurate timing calculations can be performed. While audio cards that record the cycle count can be used, a hardware trigger is a much more robust method.

Frequency Alignment

For networked systems that have GPS-locked transmission facilities, the total absolute digital carrier frequency error must be within ±1.3 Hz. For systems that have non-GPS-locked transmission facilities, the total absolute digital carrier frequency error must be within ±130 Hz.

Adjustability

The SFN requires the ability to adjust the waveform timing at each exciter to introduce phase delays between sites. These phase delays can be used to adjust exact coverage area contours.

Once the waveform synchronization between transmitter sites is completed, phase adjustments at each site can be used to shape the contours of the overlapping coverage areas. In cases of unequal transmitter power balance, where the point of equal field strength is not located at the equal distance point, the signal delay at one of the transmitters must be intentionally and precisely altered. This alters the position of the delay curves relative to the signal level curves, eliminating problem areas or allowing them to be shifted to unpopulated areas such as mountaintops or over bodies of water.

Figure 9:
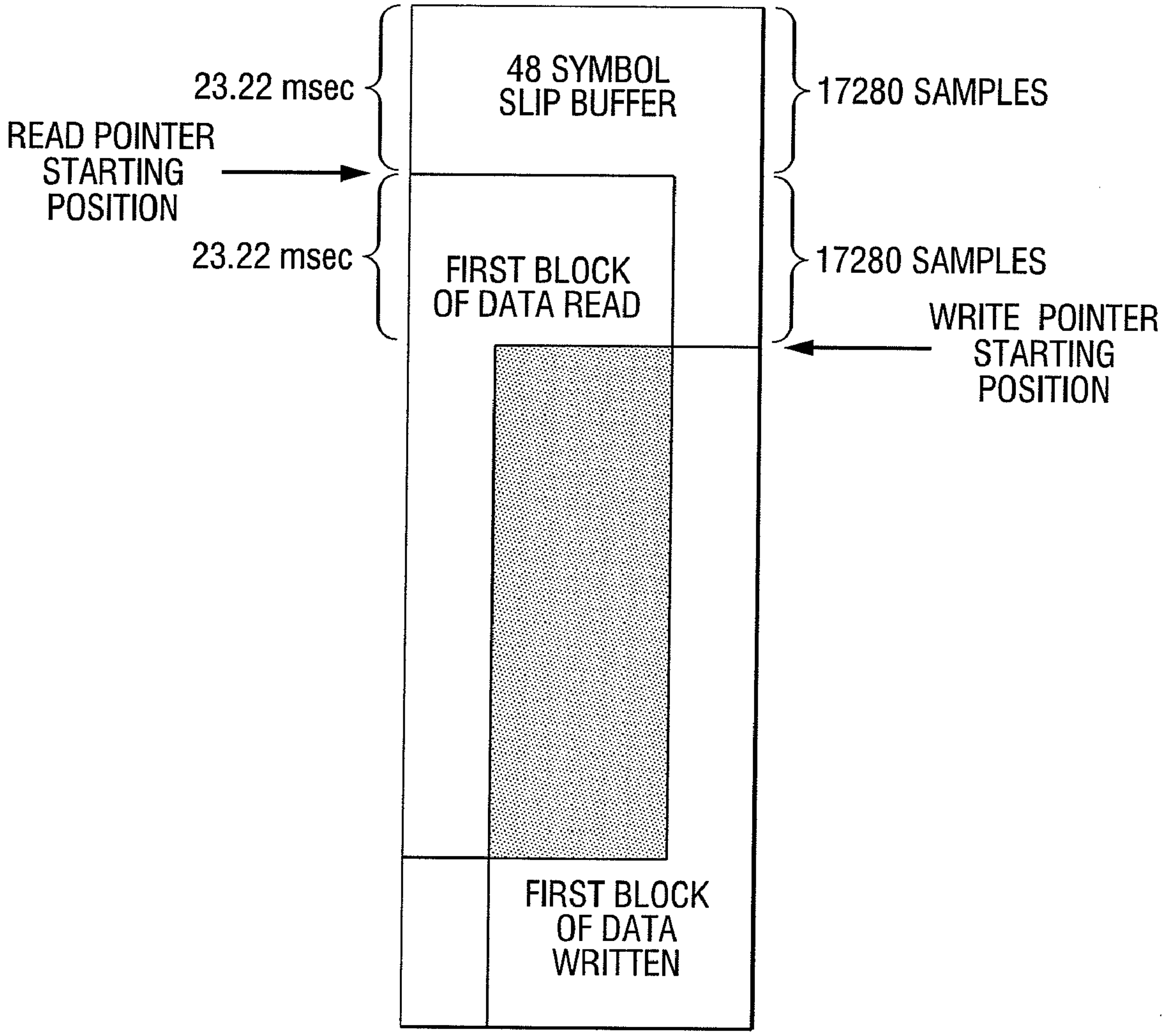
FIG. 9 is a diagram of a slip buffer for adjusting delay phase of an output waveform.

In order to facilitate this "tuning" of the SFN a slip buffer (as shown in FIG. 9) has been added into the engine software allowing the delay to be adjusted to a resolution of 1 FM sample or 1.344 μsec, or ¼ mile of propagation delay and up to ±23.22 milliseconds of total delay compensation or about ±4300 miles of propagation delay.

The slip buffer is a circular buffer and is 48 FM symbols in length. Since the buffer writes occur one symbol at a time, or 2160 IQ sample pairs, the write pointer can be incremented by the symbol size, modulo the buffer size, after each operation. The entire buffer is 48 symbols long and the write pointer will always wrap at a symbol boundary.

Buffer reads must be managed to allow for sample slips of up to ¼ of an FM block or 17280 IQ sample pairs, forward or backward. Control of the slip buffer only occurs at an FM block boundary, i.e., every 32 FM symbols or 92.88 msec. At the beginning of each block the read pointer is advanced or retarded by the number of sample slips being applied for that block and then an entire block of data is read into the output buffer. Samples are either skipped or repeated to effect the desired slip. The number of samples to slip and the number of blocks over which the slips should be applied is supplied through a control interface. Since the read pointer is initially 17280 samples behind the write pointer and 17280 samples ahead of the end of the first block of data, it can accumulate up to 17280 IQ sample slips in either direction before the 'slip' portion of the buffer is used up. Since the read pointer is being moved by an arbitrary amount of samples at each block boundary, the copy to the output buffer may be done in pieces. After the data has been copied to the output buffer the read pointer will always point to the IQ sample pair after the last one returned in the output buffer.

While the invention has been described in terms of several examples, it will be apparent to those skilled in the art that various changes can be made to the disclosed examples without departing from the scope of the invention as defined by the following claims. The implementations described above and other implementations are within the scope of the claims.

What is claimed is:

1. A broadcasting method comprising:
using a first transmitter to send a signal including a plurality of frames of data synchronized with respect to a first GPS pulse signal;
receiving the signal at a first remote transmitter;
synchronizing the frames to a second GPS pulse signal at the first remote transmitter; and
transmitting the synchronized frames from the remote transmitter to a plurality of receivers, wherein timing geometries with respect to a start time of the frames and the second GPS pulse signal are used to synchronize the frames at the remote transmitter.

2. The method of claim 1, further comprising:
synchronizing the frames to a third GPS pulse signal at a second remote transmitter; and
transmitting the synchronized frames from the second remote transmitter to the plurality of receivers.

3. The method of claim 1, wherein no timing information is communicated between the first transmitter and the remote transmitter.

4. The method of claim 1, wherein the first and second GPS pulse signals include a plurality of pulses spaced one second apart.

5. A broadcasting method comprising:
using a first transmitter to send a signal including a plurality of frames of data synchronized with respect to a first GPS pulse signal;
receiving the signal at a first remote transmitter;
synchronizing the frames to a second GPS pulse signal at the first remote transmitter; and
transmitting the synchronized frames from the remote transmitter to a plurality of receivers, wherein phase delays between synchronized frames transmitted by the remote transmitter are adjusted to alter signal delay curves relative to signal level curves and to shape an overlap coverage area of the remote transmitter.

6. The method in claim 5, wherein the phase delay adjustment is effected using a sample slip buffer.

7. A broadcasting method comprising:
using a first transmitter to send a signal including a plurality of frames of data synchronized with respect to a first GPS pulse signal;
receiving the signal at a first remote transmitter;
synchronizing the frames to a second GPS pulse signal at the first remote transmitter;
transmitting the synchronized frames from the remote transmitter to a plurality of receivers; and
sampling audio information and assembling the samples into the plurality of frames, wherein the sampling for each frame begins within a predetermined time of one of a pulse in the first GPS pulse signal, and each frame is associated with an absolute layer 1 frame number.

8. The method of claim 7, wherein the start of each of the frames is sent at a time corresponding to the absolute layer 1 frame number.

9. A broadcasting system comprising:
a first transmitter for sending a signal including a plurality of frames of data synchronized with respect to a first GPS pulse signal; and
a first remote transmitter including a circuit for synchronizing the frames to a second GPS pulse signal and for transmitting the synchronized frames to a plurality of receivers, wherein timing geometries with respect to a start time of the frames and the second GPS pulse signal are used to synchronize the frames at the remote transmitter.

10. The broadcasting system of claim 9, further comprising:
a second remote transmitter including a circuit for synchronizing the frames to a third GPS pulse signal and for transmitting the synchronized frames to the plurality of receivers.

11. The broadcasting system of claim 10, wherein no timing information is communicated between the first transmitter and the remote transmitters.

12. The broadcasting system of claim 9, wherein the first and second GPS pulse signals include a plurality of pulses spaced one second apart.

13. A broadcasting system comprising:
a first transmitter for sending a signal including a plurality of frames of data synchronized with respect to a first GPS pulse signal; and
a first remote transmitter including a circuit for synchronizing the frames to a second GPS pulse signal and for transmitting the synchronized frames to a plurality of receivers, wherein phase delays between synchronized frames transmitted by the remote transmitter are adjusted to alter signal delay curves relative to signal level curves and to shape an overlap coverage area of the remote transmitter.

14. The broadcasting system in claim 13, wherein the remote transmitters include a sample slip buffer to adjust phase delay of the synchronized frames.

15. A broadcasting system comprising:
a first transmitter for sending a signal including a plurality of frames of data synchronized with respect to a first GPS pulse signal; and
a first remote transmitter including a circuit for synchronizing the frames to a second GPS pulse signal and for transmitting the synchronized frames to a plurality of receivers, wherein the first transmitter samples audio information and assembles the samples into the plurality of frames, and wherein the sampling for each frame begins within a predetermined time of one of a pulse in the first GPS pulse signal, and each frame is associated with an absolute layer 1 frame number.

16. The broadcasting system of claim 15, wherein the start of each of the frames is sent at a time corresponding to the absolute layer 1 frame number.

17. A method of synchronizing platforms in a broadcasting system, the method comprising:
receiving a master clock signal at a base transmitter and a plurality of remote transmitters;
starting audio sampling at the base transmitter within a predetermined interval before a first clock pulse in the master clock signal;
assembling the audio samples into an audio frame;
starting transmission of the audio frame from the base transmitter to the remote transmitters at an absolute layer 1 frame number time occurring after the first clock pulse;
receiving the audio frame at the remote transmitter; and
transmitting the audio frame from the remote transmitter starting at a time corresponding to the audio frame at an absolute layer 1 frame number time.

18. The method of claim 17, wherein the master clock signal comprises a GPS clock having one pulse per second clock pulses.

19. The method of claim 18, further comprising:
supplying an offset to a digital up-converter, wherein the offset is an amount of time after a next GPS clock pulse in which the digital up-converter waveform should be turned on.

20. The method of claim 17, wherein the predetermined interval is about 0.9 seconds.

* * * * *

UNITED STATES PATENT AND TRADEMARK OFFICE

CERTIFICATE OF CORRECTION

PATENT NO. : 8,279,908 B2
APPLICATION NO. : 12/346955
DATED : October 2, 2012
INVENTOR(S) : Russell Iannuzzelli, Stephen Douglas Mattson and Muthu Gopal Balasubramanian It is certified that error appears in the above-identified patent and that said Letters Patent is hereby corrected as shown below:

In the Specifications

Column 8, Line 9
"to" should read "$t_o$"

Column 13, Line 32
"$a_{m+1}^{-}P_{n+1} \leq arm-\varepsilon$." should read "$a_{m+1}^{-}P_{n+1} = \delta$."

Signed and Sealed this
Second Day of July, 2013

Teresa Stanek Rea
*Acting Director of the United States Patent and Trademark Office*